US008048320B2

(12) United States Patent
Leach et al.

(10) Patent No.: US 8,048,320 B2
(45) Date of Patent: Nov. 1, 2011

(54) METHOD AND APPARATUS FOR COLLECTING BIOLOGICAL MATERIALS

(75) Inventors: Michael D. Leach, Warsaw, IN (US); James M. McKale, Leesburg, IN (US)

(73) Assignee: Biomet Manufacturing Corp., Warsaw, IN (US)

(*) Notice: Subject to any disclaimer, the term of this patent is extended or adjusted under 35 U.S.C. 154(b) by 0 days.

(21) Appl. No.: 12/817,814

(22) Filed: Jun. 17, 2010

(65) Prior Publication Data

US 2010/0255977 A1 Oct. 7, 2010

Related U.S. Application Data

(62) Division of application No. 11/210,005, filed on Aug. 23, 2005, now Pat. No. 7,771,590.

(51) Int. Cl.

*B01D 17/038* (2006.01)
*B01D 21/26* (2006.01)
*B04B 1/02* (2006.01)

(52) U.S. Cl. ........ 210/782; 210/781; 210/787; 210/789; 210/109; 210/121; 210/515; 210/516; 210/518; 494/16; 494/19; 436/177; 422/72; 422/527; 422/547

(58) Field of Classification Search .................. 210/781, 210/782, 787, 789, 109, 121, 515, 516, 518; 494/16, 19; 436/177; 422/72, 101, 102, 422/527, 547

See application file for complete search history.

(56) References Cited

U.S. PATENT DOCUMENTS

| | | | |
|---|---|---|---|
| 280,820 | A | 7/1883 | Hickson et al. |
| 593,333 | A | 11/1897 | Park |
| 3,409,165 | A | 11/1968 | Creith |
| 3,508,653 | A | 4/1970 | Coleman |
| 3,545,671 | A | 12/1970 | Ross |
| 3,814,248 | A | 6/1974 | Lawhead |
| 3,896,733 | A | 7/1975 | Rosenberg |
| 3,897,343 | A | 7/1975 | Ayres |
| 3,909,419 | A | 9/1975 | Ayres |
| 3,931,018 | A | 1/1976 | North, Jr. |
| 3,957,654 | A | 5/1976 | Ayres |
| 4,001,122 | A | 1/1977 | Griffin |
| 4,046,699 | A | 9/1977 | Zine, Jr. |
| 4,055,501 | A | 10/1977 | Cornell |
| 4,077,396 | A | 3/1978 | Wardlaw et al. |

(Continued)

FOREIGN PATENT DOCUMENTS

WO WO-0061256 10/2000

(Continued)

OTHER PUBLICATIONS

Developing Technologies for Accelerating Healing, *Naturally*® brochure, SmartPrep® 2, Harvest Technologies GmbH, 2002 (8 pages).

(Continued)

*Primary Examiner* — David A Reifsnyder

(74) *Attorney, Agent, or Firm* — Harness, Dickey

(57) ABSTRACT

A method and apparatus for separating and concentrating a selected component from a multi-component material. The multi-component material may include a whole sample such as adipose tissue, whole blood, or the like. The apparatus generally includes a moveable piston positioned within a separation container and a withdrawal tube that is operable to interact with a distal end of the collection container past the piston. Material can be withdrawn through the withdrawal tube.

20 Claims, 5 Drawing Sheets

U.S. PATENT DOCUMENTS

| | | | |
|---|---|---|---|
| 4,152,270 A | 5/1979 | Cornell | |
| 4,187,979 A | 2/1980 | Cullis et al. | |
| 4,303,193 A | 12/1981 | Latham, Jr. | |
| 4,511,662 A | 4/1985 | Baran et al. | |
| 4,818,386 A | 4/1989 | Burns | |
| 4,850,952 A | 7/1989 | Figdor et al. | |
| 4,917,801 A | 4/1990 | Luderer et al. | |
| 4,939,081 A | 7/1990 | Figdor et al. | |
| 5,019,243 A | 5/1991 | McEwen et al. | |
| 5,024,613 A | 6/1991 | Vasconcellos et al. | |
| 5,053,134 A | 10/1991 | Luderer et al. | |
| 5,197,985 A | 3/1993 | Caplan et al. | |
| 5,207,638 A | 5/1993 | Choksi et al. | |
| 5,269,927 A | 12/1993 | Fiehler | |
| 5,271,852 A | 12/1993 | Luoma, II | |
| 5,456,885 A | 10/1995 | Coleman et al. | |
| 5,474,687 A | 12/1995 | Van Vlasselaer | |
| 5,560,830 A | 10/1996 | Coleman et al. | |
| 5,588,958 A | 12/1996 | Cunningham et al. | |
| 5,632,905 A | 5/1997 | Haynes | |
| 5,645,540 A | 7/1997 | Henniges et al. | |
| 5,646,004 A | 7/1997 | Van Vlasselaer | |
| 5,648,223 A | 7/1997 | Van Vlasselaer | |
| 5,663,051 A | 9/1997 | Vlasselaer | |
| 5,707,647 A | 1/1998 | Dunn et al. | |
| 5,707,876 A | 1/1998 | Levine | |
| 5,736,033 A | 4/1998 | Coleman et al. | |
| 5,738,796 A | 4/1998 | Bormann et al. | |
| 5,785,700 A | 7/1998 | Olson | |
| 5,811,151 A | 9/1998 | Hendriks et al. | |
| 5,823,986 A | 10/1998 | Peterson | |
| 5,824,084 A | 10/1998 | Muschler | |
| 5,840,502 A | 11/1998 | Van Vlasselaer | |
| 5,916,743 A | 6/1999 | Lake et al. | |
| 5,938,621 A | 8/1999 | Kelly et al. | |
| 5,955,032 A | 9/1999 | Kelly et al. | |
| 5,958,253 A | 9/1999 | Holm et al. | |
| 6,053,856 A | 4/2000 | Hlavinka | |
| 6,063,297 A | 5/2000 | Antanavich et al. | |
| 6,071,422 A | 6/2000 | Hlavinka et al. | |
| 6,153,113 A | 11/2000 | Goodrich et al. | |
| 6,214,338 B1 | 4/2001 | Antanavich et al. | |
| 6,221,315 B1 | 4/2001 | Giesler et al. | |
| 6,264,890 B1 | 7/2001 | Boehringer et al. | |
| 6,280,400 B1 | 8/2001 | Niermann | |
| 6,328,765 B1 | 12/2001 | Hardwick et al. | |
| 6,398,972 B1 | 6/2002 | Blasetti et al. | |
| 6,406,671 B1 | 6/2002 | DiCesare et al. | |
| 6,440,444 B2 | 8/2002 | Boyce et al. | |
| 6,508,778 B1 | 1/2003 | Verkaart et al. | |
| 6,558,341 B1 | 5/2003 | Swisher | |
| 6,629,919 B2 | 10/2003 | Egozy et al. | |
| 6,716,187 B1 * | 4/2004 | Jorgensen et al. | 210/789 |
| 2001/0009757 A1 | 7/2001 | Bischof et al. | |
| 2002/0035820 A1 | 3/2002 | Farris | |
| 2002/0104808 A1 | 8/2002 | Blasetti et al. | |
| 2002/0161449 A1 | 10/2002 | Muschler | |
| 2002/0182664 A1 | 12/2002 | Dolecek et al. | |
| 2003/0050709 A1 | 3/2003 | Noth et al. | |
| 2003/0050710 A1 | 3/2003 | Petersen et al. | |
| 2003/0185803 A1 | 10/2003 | Kadiyala et al. | |
| 2003/0205538 A1 * | 11/2003 | Dorian et al. | 210/789 |
| 2007/0208321 A1 | 9/2007 | Leach et al. | |
| 2008/0193424 A1 | 8/2008 | McKale et al. | |

FOREIGN PATENT DOCUMENTS

WO WO-0183068 11/2001

OTHER PUBLICATIONS

GPS® II System brochure, Gravitational Platelet Separation System Accelerating the Body's Natural Healing Process, Cell Factor Technologies, Inc., a subsidiary of Biomet, Inc., Jun. 30, 2005 (16 pages).

Symphony™ II, Platelet Concentrate System brochure, Increasing bone graft bioactivity through reproducible concentrations of natural growth factors, DePuy, 2003, (8 pages).

* cited by examiner

METHOD AND APPARATUS FOR COLLECTING BIOLOGICAL MATERIALS

CROSS-REFERENCE TO RELATED APPLICATIONS

This application is a divisional of U.S. patent application Ser. No. 11/210,005 filed on Aug. 23, 2005, now U.S. Pat. No. 7,771,590. The entire disclosure of the above application is incorporated herein by reference.

FIELD

The present teachings relate generally to collection of selected biological materials, in particularly to a method and apparatus for separating and collecting a selected biological component.

BACKGROUND

Various biological materials, such as whole blood, adipose tissue and the like, are formed of a plurality of components or fractioned. These various fractions can be collected and separated from an anatomy, such as a human anatomy, using various techniques. Nevertheless, generally known techniques may require a plurality of steps and a large volume of biological materials to obtain a selected biological component.

For example, collecting a selected component of whole blood or adipose tissue requires collecting a large sample of whole blood or whole adipose tissue and performing several steps to obtain a selected fraction of the whole sample. Nevertheless, it may be desirable to obtain a selected volume for a procedure where time and quantity are selected to be minimal. Therefore, it may be desirable to provide a method and apparatus to obtain a selected volume of a fraction of a biological material in a short period of time from a selected volume.

SUMMARY

A method and apparatus is provided for obtaining a selected fraction or component of a biological material for a use. The apparatus can generally include a container, including a piston that is interconnected with a withdrawal tube to withdraw a selected fraction of a whole material. Generally, the withdrawal tube can pass through a selected portion of the piston, such as a distal end of the piston to obtain a material that is positioned near a distal portion of the container.

According to various embodiments, a system to separate a component from a selected material is disclosed. The system can include a separation container operable to contain the selected material. A piston can be positioned in said separation container. A conduit can be positioned in said separation container. The conduit can remove and/or deliver the selected material to a distal end of said separation container past said piston.

According to various embodiments, a kit for separating a selected component from a material is disclosed. The kit can include a separation container operable to hold the material. A piston can be positioned in said separation container having a density and a first side and a second side. A withdrawal tube can extend between a first end and a second end. The second end can be positioned past said second side of said piston opposite of said first end. A collection system can obtain the material and a withdrawal system can withdraw the selected component from said separation container.

According to various embodiments, a method of separating a selected biological component from a biological material with a separation system including a piston and a withdrawal tube is disclosed. The method can include positioning the biological material in the separation container near a first side of the piston. A force can be applied to the biological material in the separation container. The selected biological component can be sequestered near a second side of the piston from the remainder of the biological material in the separation tube. The selected biological component can be withdrawn from the separation container through said withdrawal tube.

Further areas of applicability of the present teachings will become apparent from the detailed description provided hereinafter. It should be understood that the detailed description and various embodiments are intended for purposes of illustration only and are not intended to limit the scope of the teachings.

BRIEF DESCRIPTION OF THE DRAWINGS

The present teachings will become more fully understood from the detailed description and the accompanying drawings, wherein.

DETAILED DESCRIPTION OF VARIOUS EMBODIMENTS

The following description of the various embodiments is merely exemplary in nature and is in no way intended to limit the teachings, its application, or uses. Although the following teachings relate to adipose tissue, it will be understood that the teachings may apply to any appropriate multi-component material whether biological or not. It will be further understood that a component can be any appropriate portion of a whole, whether differing in density, specific gravity, buoyancy, structure, etc. The component is a portion that can be separated from the whole.

Figure 1:
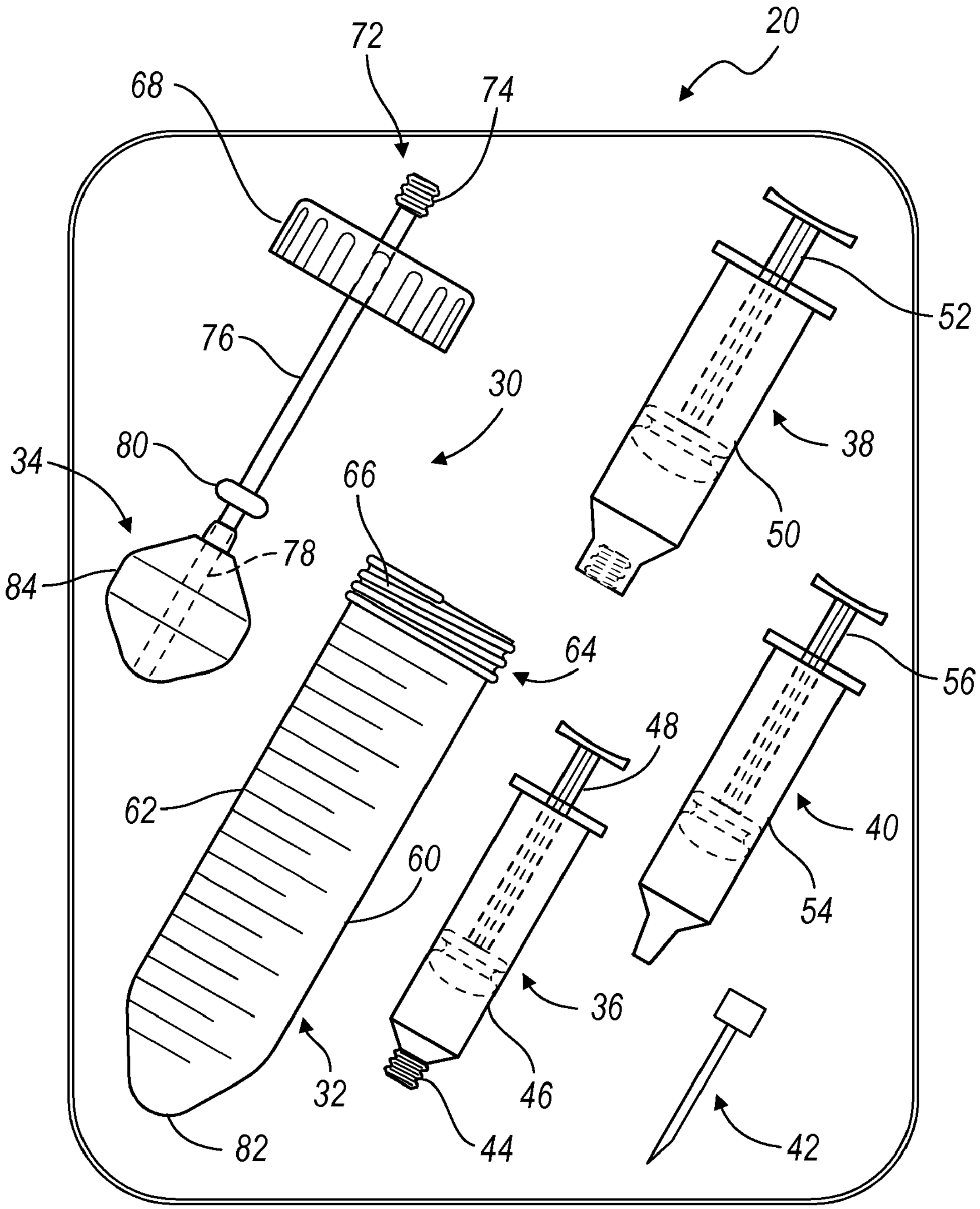
FIG. 1 is a kit of an apparatus according to various embodiments.

With reference to FIG. 1, a kit 20 can be provided to allow for collection, separation, and application of a selected biological material or component. The kit 20 can be understood to include any appropriate devices or materials, and the following devices are merely exemplary. The kit 20 can include a separation device 30 that can be used to separate a selected material, such as an adipose tissue, a whole blood sample, or the like. It will be understood that the separation device 30 can be disposable, reusable, or combinations thereof. For example, the separation device 30 can include a container 32 that may be reusable while a separation piston 34 is not. Further, the kit 20 can include a collection device such as a syringe 36, an application device such as a syringe 38 and a mixing material that may be included in a syringe 40. The mixing material may be any appropriate material such as an anti-clotting agent, a clotting agent, an antibiotic, or the like. It will be understood that the kit 20 may also include any other appropriate materials such as bandages, tourniquets, sterilization materials or the like. It will be further understood that the kit 20 may be provided sterilized, prepared for sterilization, or any appropriate combination thereof.

The various syringes 36, 38, 40, may be any generally known syringe. Nevertheless, the syringe 36 may also be interconnectable with a needle 42 that can interconnect with a luer fitting 44 of the syringe 36. The syringe 36 can generally include a container 46 and a plunger 48. This can allow the syringe 36 to withdraw a selected sample, such as an adipose tissue sample from an anatomy, such as a human anatomy, for various purposes. The application syringe 38 can also include a container 50 and a plunger 52. The application syringe 38 can be any appropriate syringe and can be of a size to interconnect with the selected portion of the separation device 30, such as discussed herein. Further, the mixing syringe 40 can also include a container 54 and a plunger 56. The mixing syringe 40 can include any appropriate material, such as those described above. The mixing material provided in the mixing syringe 40 can be added to the container 32 at any appropriate time for interaction with the selected material that can be positioned in the separation container 30.

The separation device 30 includes the container 32 that can include various features. For example, container 32 can be any appropriate size such as 20 ml, 40 ml, 60 ml, any combination thereof, fraction thereof, or any appropriate size. The collection container 32 includes a side wall 60 that can assist in containing the material positioned in the container 32. The tube 32 may also include demarcations 62 that indicate a selected volume.

The sidewall 60 may or may not be flexible under a selected force. For example, the separation device 30 can be positioned in a centrifuge or similar device to apply an increased force of gravity to the material positioned in the tube 32. If the tube 32 is formed of a selected material, the sidewall 60 may flex under the high force of gravity to cause an increased diameter of the tube 32 under the higher force of gravity. Alternatively, the sidewall 60 of the container 32 may be formed of a substantially rigid material that will not flex under a high force of gravity.

The tube 32 further includes a top or proximal portion that defines a cap engaging region 64. The cap engaging region 64 can include a thread or partial threads 66 that can interconnect with a cap 68. The cap 68 can include an internal thread that can thread onto the thread 66 of the top portion 64 to fix the cap 68 relative to the tube 32. Therefore, the cap 68 can be removed from the tube 32, but it will be understood that the cap 68 can also be formed as an integral or single portion of the tube 32. Therefore, it will be understood that the separating device 30 can be provided as a modular system or can be formed as an integral or unitary member.

Extending through the cap 68 can be a collection or application port 72. The port 72 can include a luer locking portion 74, or any other appropriate interconnection portion. The port 74 can extend through the cap 68 to a withdrawal tube 76. It will be understood that the withdrawal tube 76 may be formed as a single piece with the port 72 or can be interconnectable with the port 72. Further, the withdrawal tube 76 can extend through the piston 34 through a central channel 78 defined through the piston 34.

The withdrawal tube 76 can define a piston stop or stop member 80. The stop portion 80 can act as a stop member for the piston 34 so that the piston 34 is able to move only a selected distance along the withdrawal tube 76. The stop 80 can also be formed by any appropriate portion, such as the sidewall 60. The stop 80 is provided to assist in limiting a movement of the piston 34. Therefore, it will be understood that the withdrawal tube 76 may also act as a rod on which the piston 34 is able to move.

The piston 34 can include any appropriate geometry such as a geometry that substantially mates with the tube 32, particularly a distal end 82 of the tube 32. It will be understood, however, that the piston 34 can also include any other appropriate geometry to interact with the tube 32. Further, the piston 34 can include a contacting or central region 84 that includes an outer dimension, such as a circumference or diameter that is generally equivalent to an inner diameter or circumference of the tube 32. Therefore the piston 34 can contact or engage the sidewall 60 of the tube 32 at a selected time.

The middle or tube engaging portion 84 of the piston 34 can include the dimension that is substantially similar to an unchanged or unforced dimension of the wall 60 of the tube 32. For example, it may be formed so that there is substantially little space or a sliding engagement between the tube engaging portion 84 of the piston 34 and the tube 32. However, under a selected force, such as a centrifugal force, the wall 60 of the tube 32 can be compressed axially and be forced outward thereby increasing a dimension, such as a diameter, of the tube 32. The increasing of the diameter of the tube 32 relative to the piston 34 can allow for a freer movement or non-engagement of the tube 32 with the piston 34. In this way, the piston 34 can move relative to the tube 32 or materials can move between the piston 34 and the tube 32.

For example, as discussed herein, the piston 34 may move relative to the tube 32 when the tube is compressed, thus increasing the tube's 32 diameter. The piston 34 can move relative to the withdrawal tube 76 which can allow the piston 34 to move a selected distance relative to the tube 32 or the cap 68. The stop 80 that is provided on the withdrawal tube 76 can assist in the minimizing or selectively stopping the piston 34 relative to the rod 76. This can allow for a maximum motion of the piston 34 relative to the withdrawal tube 76.

A selected material, such as a biological material, can be positioned in the tube 32 and the tube 32 can be positioned in a centrifuge with the piston 34. During the centrifugal motion, the tube 32 can compress, thereby increasing its diameter relative to the piston 34, which can allow the piston 34 to more easily move relative to the withdrawal tube 76 and the container tube 32. Therefore, the piston 34 can assist in separating a selected material positioned in the container tube 32. Nevertheless, once the centrifugal force is removed or reduced, the axial compression of the container tube 32 can be reduced to thereby return it substantially to its original dimensions. As discussed above, its original dimensions can be substantially similar to those of the piston 34, particularly the tube engaging portion 84 which can hold the piston 34 in a selected position relative to the tube 32. This can assist in maintaining a separation of the material positioned in the tube 32, such as that discussed herein.

It will be understood that the separation container system 30 can be used with any appropriate process or various selected biological materials or multi-component materials. Nevertheless, the separation system 30 can be used to separate a selected biological material such as stromal cells, mesenchymal stem cells, blood components, adipose components or other appropriate biological or multi-component materials. Thus, it will be understood that the following method is merely exemplary in nature and not intended to limit the teaching herein.

Figure 2:
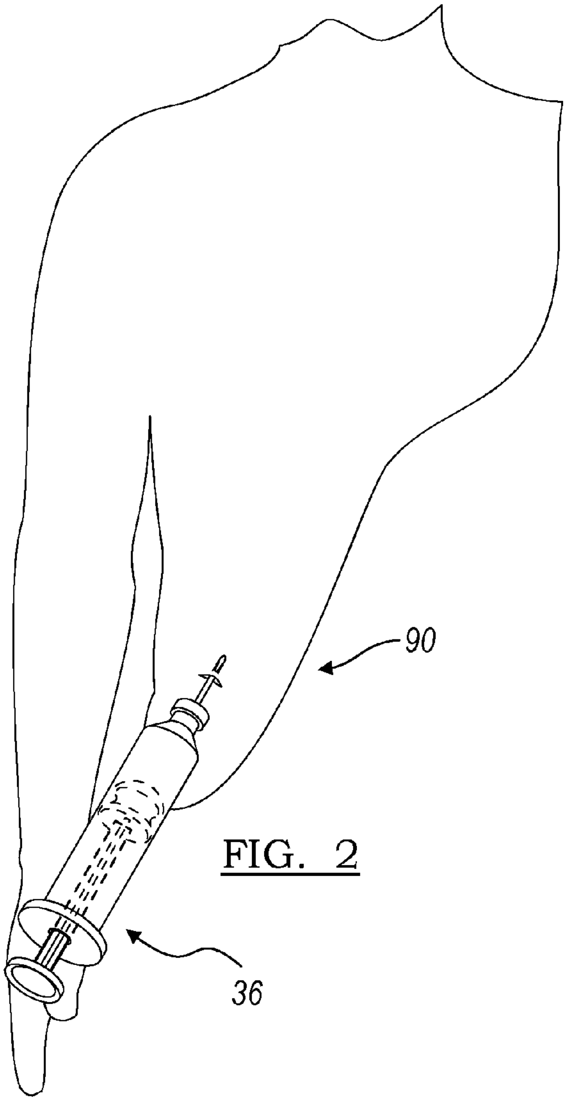
FIG. 2 is an environmental view of a separating device according to the various embodiments.
Figure 3:
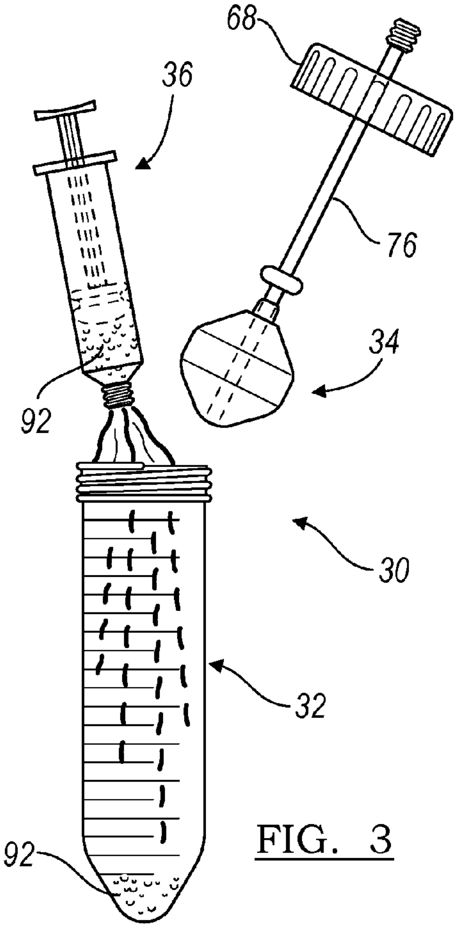
FIG. 3 illustrates the separating device being filled according to various embodiments.

With additional reference to FIG. 2, a patient 90 can be selected. The patient 90 can include an appropriate anatomy and the collection device 36 can be used to collect a selected portion of biological material. For example, the collection device 36 can engage a portion of the patient 90 to withdraw a selected volume of adipose tissue. The adipose tissue can be selected from any appropriate portion of the anatomy, though it can be selected from the abdominal region. In addition, various other components may be withdrawn into the collection tube 36, such as whole blood, stem cells, and the like. Further, the collection device 36 can be a plurality of collection devices that each collect different components, such as one to collect adipose tissue, one to collect whole blood, and others to collect other selected biological materials.

Once the selected biological material is withdrawn into the collection device 36, the biological material 92 can be placed into the container 32. Once the container 32 has been filled an appropriate amount with the biological material 92, the piston 34, the rod 76, and the cap 68 can be interconnected with the collection tube 32.

Figure 4:
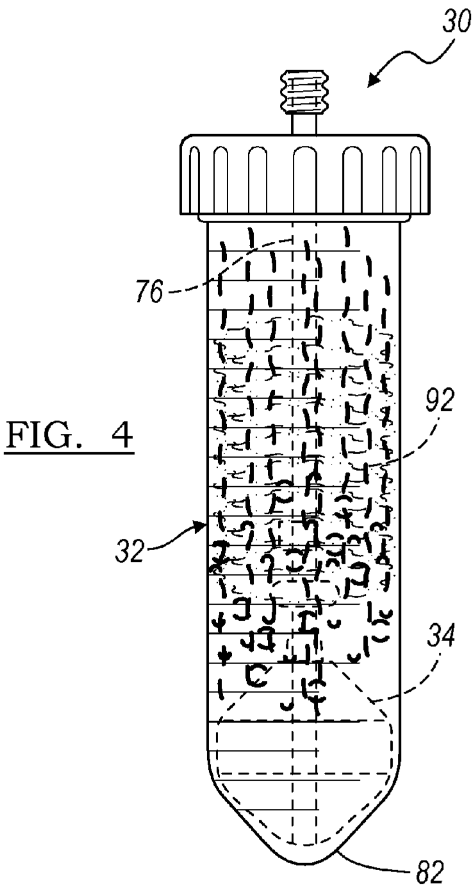
FIG. 4 is an environmental view of a filled separating device according to various embodiments.

With additional reference to FIG. 4, the assembled separation device 30 can be pre-treated prior to various other processing steps. For example, selected components, including enzymes, chemicals, and the like, can be added to the container tube 32. Further, the selected material, which can include adipose tissue, can be sonicated or treated with a sonic radiation prior to further processing steps. The sonication of the adipose tissue can perform various steps. For example, the sonication of the adipose tissue can remove or release stromal cells from the adipose tissue cells. It will be understood that sonication of the adipose tissue can be performed at any appropriate time. For example, the sonication of the adipose tissue can be performed once it has been collected into the collection device 36 and prior to being positioned in the container 32 or after it has been positioned in the container 32. Further, all of the selected materials, which may include whole blood, various components of whole blood, or the like, can be also added to the container 32.

Figure 5:
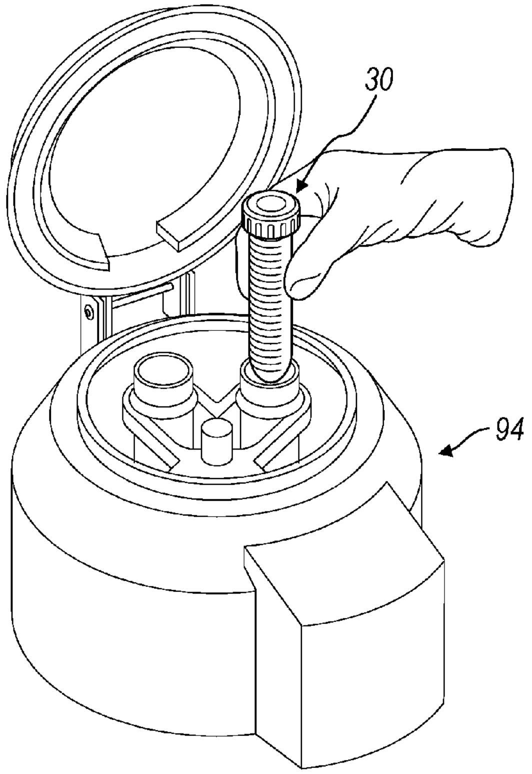
FIG. 5 is an environmental view of a separating device at a centrifuge according to various embodiments.

With reference to FIG. 5, once the separation system 30 has been pre-processed, such as with sonication, various chemicals, various biologically active materials, such as enzymes, can be positioned in an appropriate separation device, such as a centrifuge 94. The centrifuge 94 can be operated according to any appropriate technique to perform a high gravity separation of the material positioned in the separation device 30. Nevertheless, the centrifuge device can be spun at any appropriate rotation per minute (RPM) such as about 2000 to about 4030 RPMs. This can form a force of gravity on the separation device 30 and the various materials positioned therein of about 740 G's to about 3000 G's. Further, the centrifugation step with the centrifuge device 94 can be performed for any appropriate amount of time. For example, the separation device 30 can be spun at the selected RPMs for about 5 to about 15 minutes. It will be understood that one skilled in the art can determine an appropriate RPM and time setting which can be used to separate selected various materials positioned in the separation device 30. Further, the separation of different materials may require different RPMs and different separation times.

As discussed above, the piston 34 can be positioned in the collection tube 32 to assist in separating the materials positioned in the separation container 32. The piston 34 can be formed of any appropriate materials and according to any appropriate physical characteristics. For example, the piston 34 can be formed of a material or combination of materials that can achieve a selected density that can assist in separating, such as physically separating selected components of the biological material 92 positioned in the separation device 30. For example, the piston 34 can include a density that is about 1.00 grams per milliliter to about 1.10 grams per milliliter, such as less than about 1.06 grams per cc or 1.06 grams per milliliter. The selected density can assist in separating denser components or components with a higher specific gravity, such as stromal cells, that include a specific gravity that is greater than other components of the biological material 92 positioned in the tube 32 and also greater than that of the piston 34. The piston 34, however, can include any appropriate density.

As discussed above, when the separation device 30 is positioned in the centrifuge 94, the centrifuge 94 can be spun. The forces produced by the centrifuge 94 can compress the collection container 32 which can increase its diameter thus allowing the piston 34 to move relative to the container 32. The various components of the biological material 92 positioned in the separation tube 32 can thus be physically separated by the piston 34 as it moves relative to the separation tube 32. This can assist in moving at least one of the piston 34 or a portion of the biological material 92. Though the biological material can originally be positioned on top of the piston 34, the forces and/or flexing of the sidewall 60 can allow at least a component of the material to move past the piston 34. It will be understood, however, that the sidewall 60 may not flex and that the material is simply forced past the piston 34 between the piston 34 and the sidewall 60. Thus, it will be understood that the material can move past the piston 34 to the distal end 82 to container 32 according to any appropriate method such as flexing the sidewall 60, moving between a space between the piston 34 and the sidewall 60, or any other appropriate method.

Figure 6:
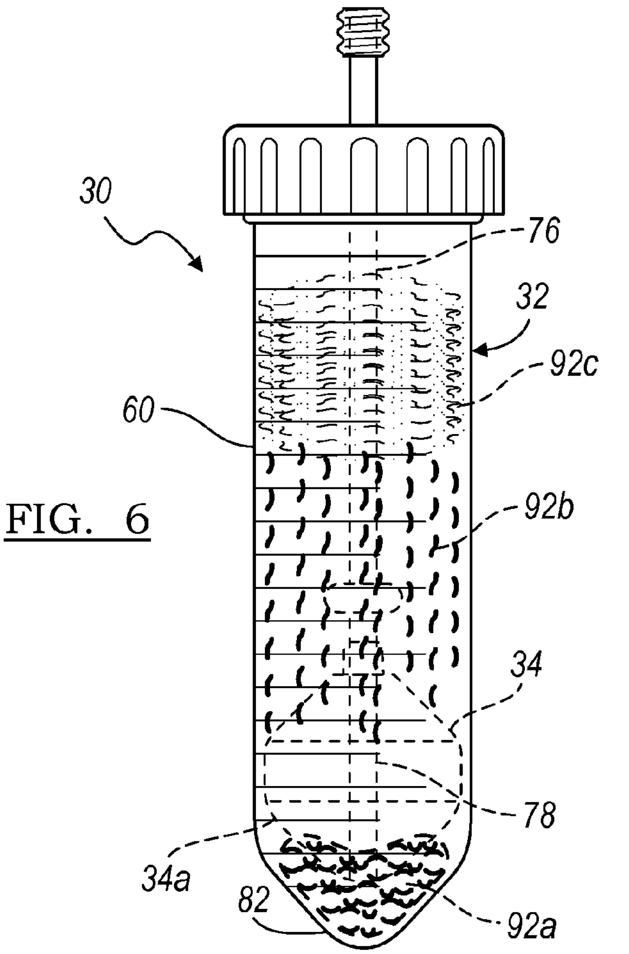
FIG. 6 is an environmental view of a separating device after being centrifuged.

With additional reference to FIG. 6, the biological material 92 can be separated into a plurality of components that are contained within the separation container 32. For example, a first component **92*a* can be positioned between the piston 34, such as a distal end of the piston 34*a* and the distal end of the separation container 82. The first biological component 92*a* can be any appropriate material, including stromal cells, mesenchymal stem cells or the like. If the biological material 92 positioned within the separation tube 32 includes adipose tissue, then various other components can include a plasma and plasma protein component 92*b* and a fat and oil components 92*c*. It will be understood, as illustrated in FIG. 6, that the fat and oil component 92*c* is generally formed near a proximal end of the tube 32 while the denser stromal cells are formed as a cell button near the distal and 82. Further, it will be understood that various materials, including plasma and plasma proteins, may also include a density that is higher than that of the piston 34 and thus may also be formed or moved towards the distal end 82 of the separation tube 32. Nevertheless, the first component 92*a* can include a high concentration of the high density materials that is of a selected material to be separated using the separation device 30, because of the piston 34 and the stop 80**.

Further, because the various materials, such as plasma or plasma proteins, can include a density that is similar to that of the first component **92*a*, which can include the stromal cells, the stop 80 can extend from the withdrawal tube 76 to ensure a low concentration or low volume of the plasma, plasma proteins, or the materials that may include a density that is greater than that of the piston 34. Although it may be selected to include a selected volume of the plasma or plasma proteins near the distal end 82 of the separation tube 32, such as for withdrawal of the selected cells, such as stromal cells, it may be selected to keep the concentration at a selected amount. Therefore the stop 80 can assist in achieving the selected volume and concentration of the first component 92***a* to be separated by the separation device 30.

Figure 7:
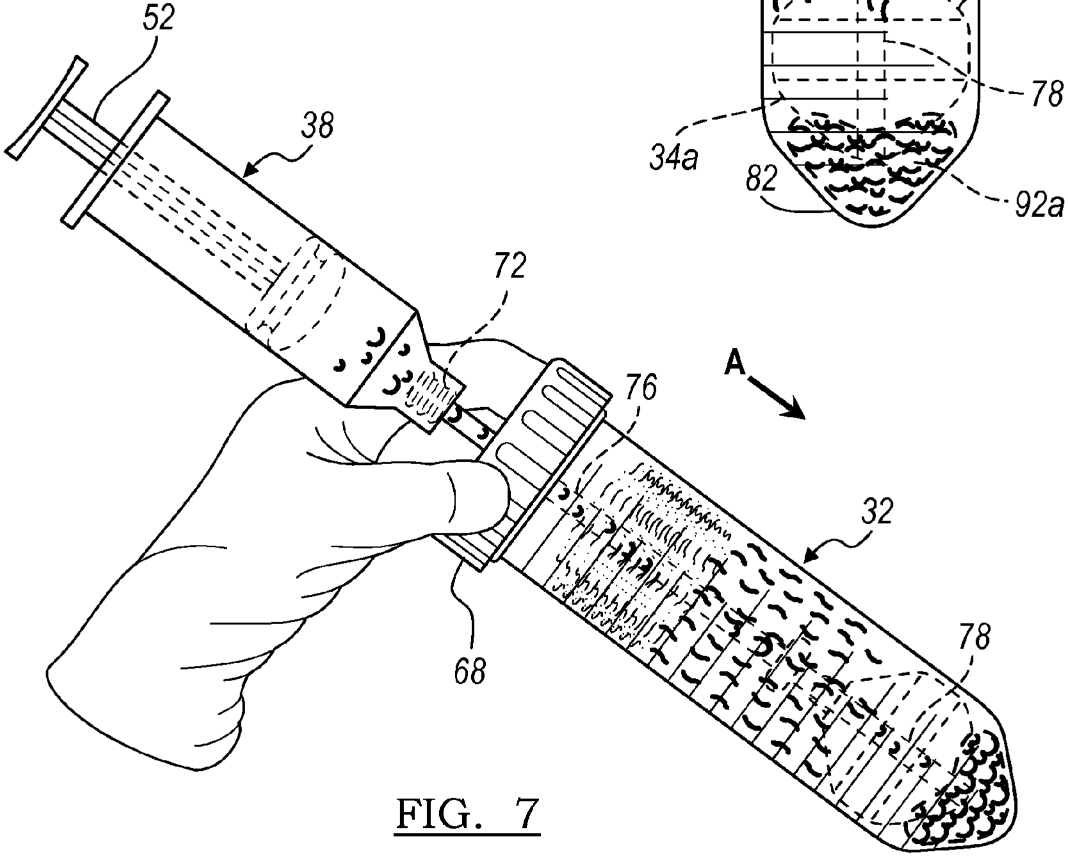
FIG. 7 is an environmental view of material being withdrawn from the separating device according to various embodiments.

With additional reference to FIG. 7, the withdrawal device 38 can be interconnected with the withdrawal port 72 which interconnects the withdrawal device 38 with the withdrawal tube 76. As discussed above, the withdrawal tube 76 can pass through the piston 34. Because the withdrawal tube 76 can be fixed relative to the cap 78, the withdrawal tube 76 may not move during the centrifugation process. This allows the piston 34 to move relative to the separation tube 32 while the withdrawal tube 76 maintains its position. The withdrawal tube 76 can include a portion positioned generally near the distal portion 82 of the separation tube 32. Therefore, the withdrawal port 72 can be interconnected or operable to remove a material that is positioned near the distal end 82 of the separation tube 32. Though the piston 34 can move proximally and allowed for separation of a volume near the distal end 82 of the separation tube 32, the withdrawal tube 76 is still positioned near the distal end 82 of the separation tube 32. Therefore, the collection device 38 can be interconnected with the withdrawal port 72 and used to withdraw the volume of material that is positioned near the distal end of the tube 82. Thus, the separated material, which can include stromal cells or other appropriate biological components, can be withdrawn after being separated and concentrated with the separation system 30 without withdrawing other various components such as the components 92*b* and 92*c* of the biological material 92.

As the collection device 38 withdraws material from the separation tube 32, the piston 34 can be moved generally in the direction of the arrow A. This can allow for a displacement of the volume being removed into the collection tube 38 as the piston 34 moves in the direction of arrow A towards the distal end 82 of the separation tube 32. Further, this movement of the piston 34 can assist in withdrawing the material from the distal end 82 of the separation tube 32.

Figure 8:
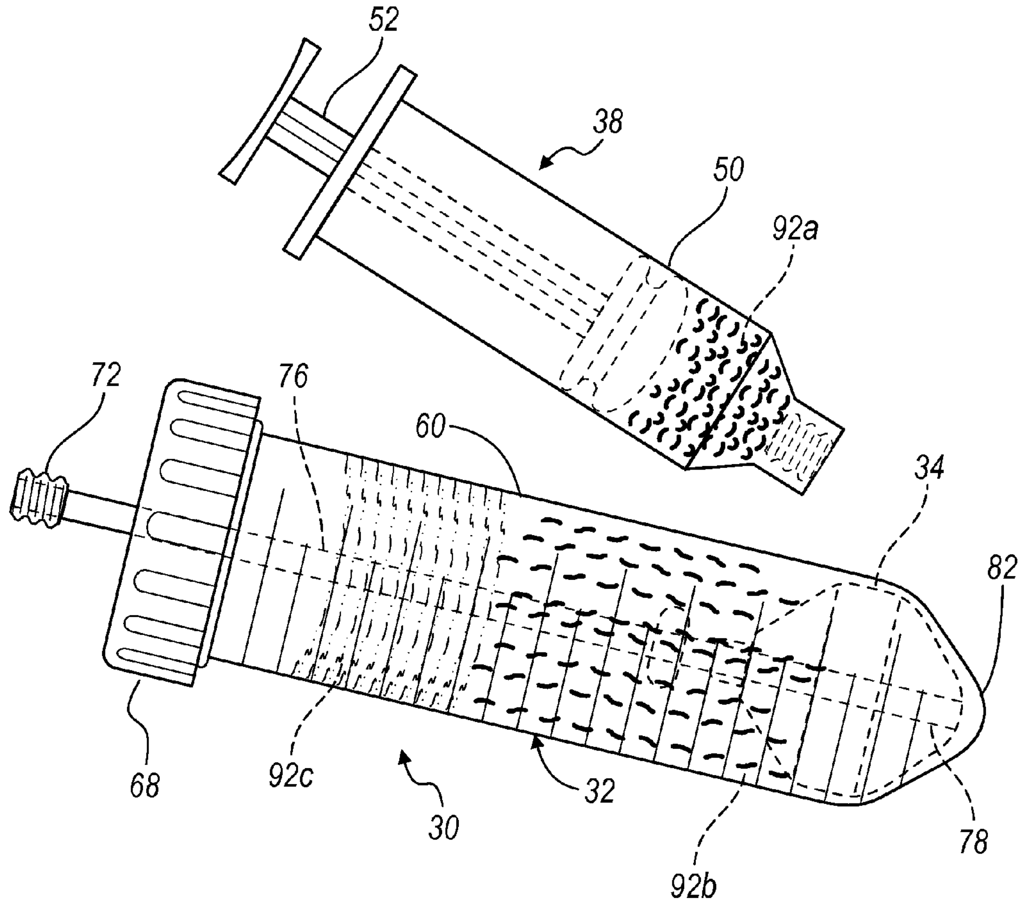
FIG. 8 illustrates the environmental view after a selected component has been withdrawn from the separating device.

With reference to FIG. 8, the piston 34 can remain or, again, substantially fill the internal volume of the distal portion 82 of the separation tube 32 as it moves toward the distal end 82 as the material is withdrawn. Therefore, the piston 34 can also assist in withdrawing the material from the separation tube 32. Since the piston 34 can substantially fill the volume of the material 92*a* being withdrawn from the separation tube 32, it can help insure that substantially all of the volume of the material 92*a* is withdrawn from the separation container 32.

Therefore, the separation device 30 can assist in separating, concentrating, and collecting a selected biological component of the biological material 92. It will be understood that while collecting stromal cells from a sonicated adipose tissue is described that the separation, concentration, and collection of any selected biological component may be performed. One skilled in the art will understand that the separation device 30 can be used with any appropriate biological material that can be positioned in the separation tube 32.

The separation device 30 can be used to separate and concentrate a selected volume of material from a substantially small volume of the whole biological material 92. Because the separation system 30 includes the various components, including the withdrawal tube 76 that extends substantially the length of the separation container 32, the piston 34, and the various other components, the biological material 92 can be affectively separated and concentrated into various component, including the denser component 92*a* and can be easily withdrawn from the separation tube 32 without interference of the other components of the biological material 92.

The withdrawn material, which may include the stromal cells, can then be used for various purposes. The withdrawn material can include the selected biological component, such as stromal cells, mesenchymal stem cells, or other stem cells. The stromal cells that are collected from the selected biological material, such as adipose tissue, can be applied to various portions of the anatomy to assist in healing, growth, regeneration, and the like. For example, during an orthopedic procedure, an implant may be positioned relative to a bony structure. The stromal cells or other components can be applied near the cite of the implantation, to the implant before implantation, to an area of removed bone, or the like, to assist in regeneration of growth of the bone. The stem cells, such as the stromal or mesenchymal cells, can differentiate and assist in healing and growth of the resected bone. Therefore, the separated and concentrated biological component, which can include the stromal cells or other appropriate biological components, can be applied to assist in regeneration, speed healing after a procedure, or other appropriate applications. Briefly, the undifferentiated cells can differentiate after implantation or placement in a selected portion of the anatomy.

The teachings are merely exemplary in nature and, thus, variations that do not depart from the gist of the teachings are intended to be within the scope of the teachings. Such variations are not to be regarded as a departure from the spirit and scope of the teachings.

What is claimed is:

1. A method of separating a selected biological component from a biological material with a separation system including a piston and a withdrawal tube, the method comprising:

positioning the biological material in a separation container near a first side of the piston;

applying a force to the biological material in the separation container;

sequestering the selected biological component near a second side of the piston from the remainder of the biological material in the separation container;

moving the piston within the separation system from a first position to a second position;

stopping the movement of the piston at the second position by engaging a stop portion fixed within the separation container; and withdrawing the selected biological component from the separation container through said withdrawal tube.

2. The method of claim 1, wherein applying a force to the biological material includes spinning the biological material in the separation system within a centrifuge.

3. The method of claim 1, wherein the stop portion extends from a member within the container between a first end of the container and the first side of the piston.

4. The method of claim 1, wherein withdrawing the selected biological components includes removing stromal cells from the separation system after stopping the movement of the piston.

5. The method of claim 1, wherein sequestering the selected biological component includes moving the piston towards a proximal end of the separation system, the biological component towards a closed distal end of the separation system, or combinations thereof.

6. The method of claim 5, wherein sequestering the selected biological component further includes holding the piston at a selected position relative to the separation container and holding the piston fixed relative to the selected biological component;

and withdrawing the selected biological component includes withdrawing the through the withdrawal tube and the piston and between the second side of the piston and the closed distal end.

7. The method of claim 1, further comprising:
obtaining the biological material.

8. The method of claim 1, further comprising:
sterilizing the separation system.

9. A method of separating a selected biological component from a biological material with a separation system including a piston and a withdrawal tube, the method comprising:
positioning the biological material in a separation container between a first terminal end of the container and a first side of the piston;
applying a force to the biological material in the separation container, wherein the piston moves along the withdrawal tube away towards the first terminal end of the container;
sequestering the selected biological component near a second side of the piston that is on an opposite side of the piston from the first side and from the remainder of the biological material in the separation container and substantially between the second side of the piston and a second terminal end of the container; and
withdrawing the selected biological component from the separation container through said withdrawal tube and from between the second side of the piston and the second terminal end of the container.

10. The method of claim 9, further comprising:
stopping the movement of the piston at a second position by engaging a stop portion fixed within the container.

11. The method of claim 10, further comprising:
limiting a volume of the sequestered biological component by the stop portion stopping movement of the piston to define a volume between the second side of the piston and the second terminal end of the container.

12. The method of claim 9, wherein withdrawing the selected biological components includes removing stromal cells from the separation system.

13. The method of claim 12, wherein withdrawing the selected biological component from the separation container through said withdrawal tube further includes withdrawing material through the piston.

14. The method of claim 13, wherein the piston is configured to move along the withdrawal tube.

15. A method of separating a selected biological component from a biological material with a separation system including a piston and a withdrawal tube, the method comprising:
positioning the biological material in a separation container near a first side of the piston;
applying a force to the biological material in the separation container;
moving the piston within the separation system from a first position to a second position to define a selected sequestering volume within the separation container between a second side of the piston and a closed distal end of the separation container
sequestering the selected biological component within the selected sequestering volume near a second side of the piston from the remainder of the biological material in the separation container; and
withdrawing the selected biological component from the selected sequestering volume within the separation container and through said withdrawal tube, wherein the selected biological component includes at least stromal cells.

16. The method of claim 15, wherein applying a force to the biological material includes spinning the biological material in the separation system within a centrifuge.

17. The method of claim 16, wherein the applied force causes the piston to move within the separation system.

18. The method of claim 15, further comprising:
stopping the movement of the piston at a second position with a stop portion fixed within the separation container to define the selected sequestering volume.

19. The method of claim 15, wherein withdrawing the selected biological component from the separation container through said withdrawal tube further includes withdrawing material through the piston.

20. The method of claim 15, wherein the positioned biological material includes a source of mesenchymal stem cells and withdrawing the selected biological component further includes withdrawing mesenchymal stem cells.

* * * * *